(12) United States Patent
Masini et al.

(10) Patent No.: US 6,649,556 B2
(45) Date of Patent: Nov. 18, 2003

(54) PROCESS FOR THE PREPARATION OF AGGLOMERATED ZEOLITES X AND LSX EXCHANGED WITH LITHIUM

(75) Inventors: Jean-Jacques Masini, La Celle Saint Cloud (FR); Dominique Plee, Lons (FR); Jean-Claude Sacleux, Honfleur (FR); Jean-Louis Vidal, Suresnes (FR)

(73) Assignee: CECA, S.A., Puteaux (FR)

( * ) Notice: Subject to any disclaimer, the term of this patent is extended or adjusted under 35 U.S.C. 154(b) by 199 days.

(21) Appl. No.: 09/897,117

(22) Filed: Jul. 3, 2001

(65) Prior Publication Data

US 2002/0031472 A1 Mar. 14, 2002

(30) Foreign Application Priority Data

Jul. 7, 2000 (FR) .............................. 00 08906

(51) Int. Cl.[7] ................................. B01J 29/08
(52) U.S. Cl. ..................... 502/79; 502/64; 502/65; 502/66; 502/73; 502/74
(58) Field of Search .............................. 502/64, 65, 66, 502/73, 74, 79

(56) References Cited

U.S. PATENT DOCUMENTS

| | | |
|---|---|---|
| 2,882,244 A | 4/1959 | Milton |
| 3,119,660 A | 1/1964 | Howell et al. |
| 3,140,933 A | 7/1964 | McKee |
| 3,906,076 A | 9/1975 | Goytisolo et al. |
| 4,603,040 A | 7/1986 | Kuznicki et al. |
| 4,859,217 A | 8/1989 | Chao |
| 5,152,813 A | 10/1992 | Coe et al. |
| 5,179,979 A | 1/1993 | Zollinger |
| 5,258,058 A | 11/1993 | Coe et al. ................. 95/96 |
| 5,417,957 A | 5/1995 | Coe et al. |
| 5,419,891 A | 5/1995 | Coe et al. |
| 5,464,467 A | 11/1995 | Fitch et al. |
| 5,932,509 A | 8/1999 | Balse et al. |
| 5,993,773 A | 11/1999 | Funakoshi et al. ........ 423/709 |
| 6,036,939 A | 3/2000 | Funakoshi et al. ........ 423/710 |
| 6,264,881 B1 * | 7/2001 | Plee ........................ 264/628 |
| 6,274,528 B1 * | 8/2001 | Labasque et al. .......... 502/79 |
| 6,407,025 B1 | 6/2002 | Brandt et al. ............. 502/65 |
| 2001/0021368 A1 * | 9/2001 | Masini et al. ............. 423/700 |

FOREIGN PATENT DOCUMENTS

| | | |
|---|---|---|
| DE | 24 46 974 | 4/1975 |
| DE | 299635 | 4/1992 |
| EP | 196043 | 10/1986 |
| EP | 0 421 875 | 4/1990 |
| EP | 0 932 581 | 10/1990 |
| EP | 0 421 875 | 4/1991 |
| EP | 0 667 183 | 8/1995 |
| EP | 0 850 877 | 7/1998 |
| EP | 0 863 109 | 9/1998 |
| EP | 0 982 269 | 3/2000 |
| FR | 2 166 094 | 8/1973 |
| GB | 1 382 450 | 1/1975 |
| JP | 4-198011 | 7/1992 |
| JP | 5-163015 | 6/1993 |
| JP | 6-183725 | 7/1994 |
| WO | WO 99/05063 | 2/1999 |

OTHER PUBLICATIONS

French Search Report for corresponding French Appln. No. FR 00.08906. No date available.
Zeolite Molecular Sieves, D.W. Breck, John Wiley and Sons, Aug. 1979, pp. 1–28.
French Search Report for corresponding French Application No. FR 000 89060. No date available.

* cited by examiner

*Primary Examiner*—M. Alexandra Elve
*Assistant Examiner*—Christina Ildebrando
(74) *Attorney, Agent, or Firm*—Smith, Gambrell & Russell, LLP

(57) ABSTRACT

Process for preparing zeolites of X type having an Si/Al atomic ratio of $\leq 1.5$ and having exchangeable cations including lithium, trivalent and/or divalent ions, and optionally sodium, potassium, ammonium and/or hydronium ions, involves distributing starting zeolite in a series of receptacles, percolating a solution of at least one lithium compound through the series, drawing a lithium-containing bleed from first receptacle of the carrousel, and drawing off a final effluent stream from a final receptacle in the series. The effluent stream contains compounds of exchangeable cations from the starting zeolite and traces of the lithium compound(s). After a desired degree of lithium exchange has occurred in the first receptacle, the first receptacle is removed and a fresh solution of at least one lithium compound is introduced into the next receptable in the series and percolated through the series. This step can be performed for each receptacle in the series.

16 Claims, 1 Drawing Sheet

FIGURE
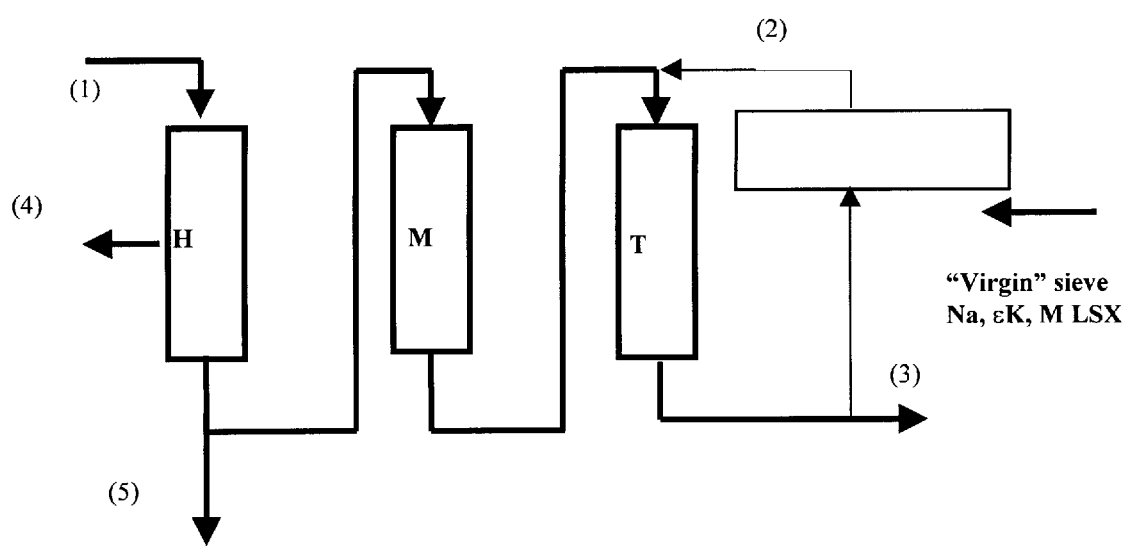

PROCESS FOR THE PREPARATION OF AGGLOMERATED ZEOLITES X AND LSX EXCHANGED WITH LITHIUM

FIELD OF THE INVENTION

The invention relates to a process for the preparation of agglomerated zeolites of X type, a portion of the exchangeable cationic sites of which is occupied by lithium ions.

BACKGROUND OF THE INVENTION

The term "zeolite of X type" is understood to mean, throughout the following, zeolites X with an Si/Al atomic ratio≧1.5 and more particularly zeolites LSX (Low Silica X), i.e. the Si/Al ratio of which is in the region of 1.

Zeolites X exchanged with lithium (that is to say, those for which at least a portion of the cationic exchangeable sites is occupied by lithium ions) have numerous industrial applications and are widely used for the separation of nitrogen from other gases, such as, for example, oxygen, argon and hydrogen, according to techniques for the selective adsorption of the gases to be separated. The zeolites employed can be provided in various forms and the exact form which they adopt can determine their usefulness in industrial adsorption processes. When zeolites are used in industrial adsorbers, it is generally preferred to agglomerate them (for example by converting them to granules) in order not to risk compacting the pulverulent zeolite in an adsorption column of industrial size, thus blocking or at the very least greatly reducing the flow through the column.

According to U.S. Pat. No. 3,140,933, a zeolite of X type having base ions replaced by lithium ions can be efficiently used to separate nitrogen from oxygen at temperatures ranging up to 30° C. Because the exchange of ions is not total and because the zeolites X have been synthesized in a sodium medium, the adsorbent used is a mixed sodium/lithium zeolite.

U.S. Pat. No. 4,859,217 discloses that very good separation of nitrogen from oxygen can be obtained by adsorption at temperatures of 15 to 70° C. using a zeolite of X type which has more than 88% of its ions in the form of lithium ions, in particular when a zeolite is used with an Si/Al atomic ratio of between 1 and 1.25.

U.S. Pat. No. 5,179,979 maintains that lithium/alkaline earth metal zeolites of X type having lithium/alkaline earth metal molar ratios of the order of 95/5 to 50/50 approximately have a higher thermal stability than that of the corresponding zeolites with pure lithium and good adsorption selectivities and capacities.

U.S. Pat. No. 5,152,813 discloses the adsorption of nitrogen from gas mixtures which uses crystalline zeolites X having an Si/Al zeolite ratio≦1.5 in which the exchangeable sites are occupied by at least 2 ions: between 5 and 95% of lithium ion and between 5 and 95% of a second ion chosen from calcium, strontium and mixtures of these, the total (lithium and second exchangeable ion) being at least 60%.

U.S. Pat. No. 5,464,467 provides a zeolite of X type, the cations of which comprise, referred to as equivalents, from approximately 50 to approximately 95% of lithium, from approximately 4 to approximately 50% of trivalent ions chosen from aluminium, scandium, gallium, iron(III), chromium(III), indium, yttrium, lanthanides alone, mixtures of two lanthanides or more, and mixtures of these, and from 0 to approximately 15% of residual ions chosen from sodium, potassium, ammonium, hydronium, calcium, strontium, magnesium, barium, zinc, copper(II) and mixtures of these, which is prepared by exchange of the exchangeable cations of the zeolite, preagglomerated with a binder, first with lithium and then with the trivalent cation or cations.

U.S. Pat. No. 5,932,509 provides for the preparation of these same zeolites according to a process which consists first in exchanging the exchangeable cations of the powdered zeolite X with trivalent cations, in then agglomerating with a binder and finally in carrying out the lithium exchange on the agglomerated zeolite. This process requires drying and intermediate activation of the zeolite material. However, it has the advantage of only carrying out the final Li exchange on a product which has been pregraded by particle separation, thus limiting the losses of finished product, which is expensive because of its lithium content.

Due to the high costs of lithium salts, it is essential to have a process for lithium exchange which is as selective as possible in order to avoid losses of lithium.

EP 863 109 discloses a continuous countercurrentwise process for exchanging the ions of a zeolite, preferably in granular form, characterized in that the solution for exchanging ions, in particular lithium ions, is passed into at least two receptacles in series, arranged so as to be able to be swapped around cyclically and filled with the zeolite to be exchanged, the exchanging solution being transferred, on each occasion, from a first receptacle in the series to the following receptacle and, when the desired level of ion exchange is obtained, the receptacle comprising the zeolite at the desired degree of exchange is taken out of the series and the exchanging solution is separated from the zeolite, which is washed, isolated and replaced by a fresh charge of zeolite to be exchanged. This process makes it possible to obtain zeolites which have been highly exchanged with lithium, that is to say for which the level of exchange with regard to lithium (corresponding to the Li/Li+Na molar ratio of the Li and Na ions in the zeolite) is high, but with a very poor output with regard to lithium, namely at most 12%; such a process cannot be transferred to the industrial scale insofar as the solution recovered at the outlet of the receptacle comprising the lithium-exchange zeolite comprises not only lithium but also the ions which were exchanged, typically sodium and/or potassium, and this solution is difficult to recover in value industrially insofar as it requires a cumbersome reprocessing treatment before possibly being able to be discharged as it is to the environment.

DESCRIPTION OF THE INVENTION

The present invention provides a process for the preparation of agglomerated zeolites X, at least a portion of the exchangeable sites of which is occupied by lithium ions, which does not exhibit the disadvantages of the processes of the prior art detailed above.

The abovementioned zeolites prepared according to the process which is a subject-matter of the invention are zeolites of X type having an Si/Al atomic ratio of less than or equal to 1.5 and preferably of between 0.9 and 1.1, the exchangeable cations of which comprise, referred to as equivalents;

from approximately 50 to approximately 99% of lithium ions and preferably at least 96%, from approximately 4 to approximately 50% of trivalent ions chosen from aluminium, scandium, gallium, iron(III), chromium(III), indium, yttrium, lanthanides or rare earth metals, alone or as mixtures, and/or of divalent ions chosen from calcium, strontium, zinc, copper, chromium(II), iron (II), manganese, nickel or cobalt, alone or as a mixture, 0 to approximately 15% of residual ions chosen from sodium, potassium, ammonium or hydronium, alone or as a mixture, agglomerated with a binder.

The process according to the invention results not only in a final level of lithium exchange of at least 96% but it is also characterized by a greatly improved output with respect to that of EP 863 109, i.e. greater than or equal to 45%, with easy treatment of the lithium-comprising effluents for the purpose of their recovery in value, indeed even, in a particularly preferred optimized embodiment, makes it possible to achieve a lithium output of greater than or equal to 80%, the level of exchange being defined as the Li/Li+Na+K ratio, where Li, Na and K are the respective concentrations of Li, Na and K in the zeolite obtained, and the lithium output as the ratio of the amount of lithium fixed to the zeolite to the amount of lithium entering.

Agglomeration

The first stage of the process developed by the Applicant Company consists of a stage of agglomeration of the starting zeolite with an inert binder. Use is conventionally made, as starting zeolite, of powdered zeolites X, the exchangeable sites of which are predominantly occupied by sodium and/or potassium ions, obtained conventionally by synthesis.

Use may also be made of zeolites, a portion of the sodium and/or potassium cations of which has been replaced by one or more di- and/or trivalent cations, such as calcium, strontium, zinc, copper, chromium(II), iron(II), manganese, nickel, cobalt, aluminium, scandium, gallium, iron(III), chromium(III), indium, yttrium, or lanthanides or rare earth metals.

The exchangeable cationic sites of the zeolite are exchanged by the divalent and/or trivalent ion or ions on the starting sodium or sodium+potassium zeolite by bringing the zeolite, preferably in the form of an aqueous suspension, into contact with a solution of the compounds of the trivalent ions and/or divalent ions by simultaneously pumping the suspension of zeolite to be exchanged and the solution of the compounds preferably into a rapid mixer capable of ensuring homogeneous mixing of the suspension and the solution after a short time of contact between the suspension and the solution (a few minutes) and more preferably still into a static mixer capable of ensuring homogeneous mixing after a very short contact time (a few seconds), all arrangements being made for the flow rates to be adjusted so as to retain a weight of suspension/weight of solution ratio which is virtually constant. Recourse to exchange in a static mixer has no effect with regard to the degree of exchange, which remains the quantitative degree achieved by conventional exchange, provided that the mixture obtained is kept maturing for approximately one hour with gentle stirring. It is found that a better random distribution of the di- and/or trivalent ions within the zeolite structure is obtained, which is reflected by the significantly improved final level of nitrogen adsorption capacity, which is entirely unexpected.

It is preferable, although this is not absolutely essential, to use aqueous solutions of the exchange ions (di- and/or trivalent ions). Any water-soluble compound of the exchanging ions can be used. The preferred water-soluble compounds of the ions are the salts and in particular the chlorides, the sulphates and the nitrates. The particularly preferred salts are the chlorides, because of their high solubilities and their ready availability.

When it is desired to prepare a zeolite, a portion of the cationic sites of which is occupied by several types of divalent and/or trivalent ions as defined above, it is possible either to simultaneously exchange all the cations, by contact with a solution comprising all these cations, or to successively exchange each cation, or to adopt a solution intermediate between the 2 preceding solutions.

A preferred alternative form consists in replacing the exchangeable cation or cations of the zeolite simultaneously by tri- and/or divalent ions and by monovalent ions, preferably the sodium ion.

Another preferred alternative form, which may or may not be combined with the preferred alternative form set out above, consists in stabilizing the zeolite with sodium hydroxide immediately after the exchange by the tri- and/or divalent ions or else after the simultaneous exchange by tri- and/or divalent ions and monovalent ions.

In a way known to a person skilled in the art, after each stage of ionic exchange, the zeolite is washed with water and then dried at a temperature generally of between 40 and 200° C.

When it is desired to obtain an agglomerated zeolite with a high level of exchange with regard to lithium, typically of greater than or equal to 96%, it is preferable to convert a very large majority, indeed even all, of the exchangeable cations of the starting zeolite or of the preagglomerated zeolite to a single monovalent cationic species, preferably the sodium or ammonium ion form. For this, the zeolite is brought into contact with a solution comprising monovalent ions, such as sodium or ammonium ions, for example an aqueous solution of NaCl (preferred) or $NH_4Cl$, before or after the agglomeration stage. The inventors have found that this stage of exchange facilitates the operation of lithium exchange by decreasing the excess "e" and facilitates the purification operation.

It is preferable for the degree of exchange with regard to potassium of the zeolite, before the lithium exchange, to be less than or equal to 15% of the total of the exchangeable sites and advantageously less than or equal to 10%.

For the agglomeration, in a first step, the said starting zeolite X is mixed with a binder, generally itself in the powder form, in the presence of water, then the mixture is converted to an agglomerate, for example by extrusion or bead formation, and the shaped zeolite/binder mixture is heated at a temperature of 400–700° C. approximately to convert the "green" agglomerate to an agglomerate which is resistant to crushing. The binders used to agglomerate zeolites include clays (particularly preferred by the Applicant Company), silicas, aluminas, metal oxides and their mixtures.

It is possible to prepare agglomerates comprising less than 5% by weight of residual binder. A process for producing these agglomerates with a low level of binder consists in converting the binder of the agglomerates described above to the zeolite phase. For this, the starting point is the agglomeration of a zeolite X powder with a binder which can be converted to zeolite (for example kaolin or metakaolin) and then the conversion to zeolite is carried out by alkaline maceration, for example according to the process disclosed in EP 932 581. It is thus possible to easily obtain according to the invention outstandingly effective granules assaying at least 95% of zeolite.

In addition, zeolites can be agglomerated with materials such as silica/alumina, silica/magnesia, silica/zirconia, silica thoria, silica/beryllium oxide and silica/titanium dioxide, as well as with ternary compositions, such as silica/alumina/thoria, silica/alumina/zirconia and clays present as binders.

The relative proportions of the constituent materials of the binder and zeolites can vary widely. The agglomeration binder generally represents from 5 to 30 parts by weight per 100 parts of agglomerated material. The agglomerates advantageously have a diameter from approximately 0.2 to approximately 5 mm.

An alternative form of the agglomeration stage, for zeolites for which a portion of the exchangeable cationic sites is occupied with di- and/or trivalent cations, consists first in agglomerating the sodium or sodium+potassium zeolite before exchanging a portion of the sodium and optionally potassium ions of the zeolite, thus agglomerated, with di- and/or trivalent cations.

Li Exchange

With regard to the agglomerated zeolite, at least a portion of the exchangeable cations of the zeolite is subsequently exchanged by bringing the agglomerated zeolite, preferably in aqueous suspension, into contact with a solution of lithium compound (1), preferably an aqueous solution of lithium salt, such as LiCl, according to the procedure given in detail below:

The agglomerated zeolite to be exchanged (for which, for simplicity in the account which follows, the exchangeable cations are regarded as solely Na and K) is distributed in at least 2, preferably at least 3, receptacles in the stationary bed form which are arranged in series in an interchangeable manner and the solution of lithium compounds is conveyed through the said receptacles arranged in series; the sequence of the receptacles arranged in series, known as a "carrousel, is modified cyclically at given time intervals, the inlet of the fresh solution being moved on each occasion from the 1st receptacle, in which is found the zeolite which has been exchanged with lithium to the greatest extent, to the following receptacle in the series; when the desired degree of exchange with regard to lithium is reached for the zeolite in the 1st receptacle, the latter is taken out of the series of receptacles of the carrousel and the zeolite which is present therein is freed from the solution of lithium compounds by washing, then discharged (4) and optionally replaced by a fresh charge of zeolite to be exchanged.

The process according to the invention is characterized in that a bleed (5) is drawn off from the stream corresponding to the excess of lithium employed (in what follows, for simplicity, the lithium compound solution used is regarded as an aqueous LiCl solution), it being set apart from the effluent generated by the carrousel, and in that the following are extracted from the carrousel:

first the stream (5) corresponding to the percolation "e" at the outlet of the head column of the carrousel, subsequently the stream (3) corresponding to the percolation "$E_0$" at the carrousel outlet, "$E_0$" being defined as the stoichiometric equivalent of exchangeable lithium of the sieve and "e" the excess necessary in order to obtain the targeted level of exchange, which can unexpectedly be greater than 96%.

Two streams are thus obtained:

the 1st stream (5) or bleed (at the outlet of the 1st receptacle) is in fact an LiCl solution comprising a small amount of NaCl and KCl, the 2nd stream (3) (outlet of the carrousel) is rich in NaCl and KCl, and comprises reduced amounts of LiCl, which has the advantage that it can be discharged to the natural environment with a simplified purification treatment for lithium.

The diagram represented in the appended figure corresponds to the process according to the invention as described above.

The process according to the invention comprises 3 phases:

1—initial startup of the carrousel, which operation consists in placing the system of the columns at a level of Li exchange by percolating an Lithium chloride solution (1) over the columns of the carrousel filled with the starting zeolite such that the process is running from the insertion of a fresh charge into the carrousel, 2—normal functioning (the process follows the same procedure as described above and leads to results which are stable overall cycle after cycle), 3—end of the cycle.

In the preferred case where the plant operates with 3 columns, the initial startup stage can also consist:

either in installing, in the first and second places of the exchange line, 2 pre-exchanged columns resulting from the end of the preceding campaign, the tail position being occupied by a column of "virgin" beads; in this case, startup requires a lower Li consumption substantially identical to that of a conventional cycle in normal operation;

or in starting with 3 columns of "virgin" sieve but partially replacing the pure solution of LiCl with a recycled solution of Li resulting from the end of the preceding campaign.

The 2 alternatives to the initial startup stage described in detail above are of some economic advantage because they restrict the losses of lithium.

In the preferred case where the plant operates with 3 columns, 2 alternatives can be applied at the end of the cycle:

either the washing is continued over the line of the 3 columns (the Li solution being recovered for the purposes of recycling over "virgin" beads at the beginning of the following campaign), which involves drying 2 charges of pre-exchanged beads which will be used to initiate the startup of the following campaign, or the exchange is continued over the line of the 3 columns with recovery of the solutions rich in Li (5) which are generated, so as to achieve a degree of exchange with regard to Li of 96% for the beads in the final columns of the carrousel. These solutions will advantageously be used as initial startup solution.

The temperature of the solution of lithium compounds is preferably between 80 and 120° C. and in particular between 110 and 120° C. Higher temperatures can be used by pressurizing the system at a pressure advantageously above the vapour pressure of the exchanging solution at the temperature under consideration.

The lithium concentration of the solution, limited by the solubility of the salts, is chosen to be as high as possible in order to reduced the costs related to the reprocessing. It is preferable to employ lithium solutions with a concentration of between 1 and 10M and preferably between 3 and 6M.

A stage of purification by crystallization of the LiCl bleed is advantageously added to the above process: this stage makes possible selective removal of most of the NaCl and of the KCl residues present in the bleed, so as to be able to carry out the recycling of the latter instead of the stream "e" during the following exchange operation. An independent loop for extraction of sodium and potassium is thus created.

Moreover, it is possible to further improve the operation of the carrousel by recycling (before discharge) the final effluent NaCl+KCl+traces of LiCl over the final receptacle of the carrousel, then charged with zeolite X, which has the advantage of minimizing the losses of lithium even more and of bringing the carrousel more rapidly to the thermal conditions.

The zeolites prepared are advantageously used as adsorbents of the nitrogen present in a gas mixture, and in particular the air, and thus make it possible to separate the nitrogen from the other gases present in the gas mixture. The separation is carried out by passing the gas mixture into at least one adsorption region comprising the zeolites thus prepared.

EXAMPLES

The examples which follow give a better understanding of the invention.

Comparative Example 1 a. Preparation of Na, K, M, LSX beads with a diameter of 1.6–2.5 mm 1,000 liters of softened industrial water are introduced into a vessel equipped with a propeller stirrer. 200 kg of powdered zeolite LSX (amount considered as anhydrous product), with an Si/Al atomic ratio equal to 1, the exchangeable cationic sites of which are 77% occupied by sodium and 23% occupied by potassium, with a micropore volume equal to 0.262 $cm^3/g$ (measured by toluene adsorption at 25° C. under a relative pressure of 0.5) and with a Dubinin volume equal to 0.325 $cm^3/g$, are added with stirring (100 rev/min and peripheral speed=3.5 m/s). 45 kg of solution of industrial rare earth metal chlorides, which solution is sold by Rhodia under the name LADI (aqueous solution comprising lanthanum and praseodymium chlorides at concentrations, expressed as $La_2O_3$ and $Pr_2O_3$, of 16.6 and 7.2% by weight respectively, the remainder being predominantly composed of water and of traces of chlorides of other rare earth metals (Ce, Nd)), are subsequently introduced over approximately 10 minutes. The stirring is decreased to 20 rev/min and the reactor is maintained under these conditions for approximately 1 hour, at the end of which time it is found that the mixture is finally homogeneous, after which the powder thus obtained is filtered off, washed and dried.

The powder is subsequently agglomerated using a clayey binder at the level of 17% by weight (considered with respect to the total agglomerated material). The product is shaped in the form of beads with a diameter of 1.6–2.5 mm. These beads are dried at 80° C. and then activated according to the LTC (traversed bed) technology, disclosed for example in EP 421 875, at 580° C. under dry air devoid of carbon dioxide.

The analysis of the agglomerated and exchanged zeolite, expressed as percentage of the initial zeolite LSX exchange capacity, is thus:

| rare earth metal equivalents | 14% |
|---|---|
| sodium equivalents | 69% |
| potassium equivalents | 17% | b. Lithium exchange according to the process of the invention (targeted decree of Li exchange 96%)

b-1. The carrousel is composed of 3 cylindrical columns H (head column), M (middle column) and T (tail column), with a cross section of 0.695 $m^2$ and a bed height of 6 m, which are equipped with a top distributor and a support grid with a mesh suitable for the particle size of the beads at the column bottom, each column being filled with 2 700 kg of the beads prepared in stage a.

The initial startup of the carrousel consists in percolating, from the top downwards, a solution of lithium chloride (1) over the 3 columns of the carrousel. The amount of Li percolated is of the order of approximately 4.7 $E_0$ (first 1.7 $E_0$ corresponding to an aqueous solution of LiCl also containing approximately 7 g/l of Na and 1.5 g/l of K and then 3 $E_0$ of pure LiCl solution). The LiCl solutions, with respective concentrations of 1M and 4M, are brought to 115° C. before successively feeding the line of the 3 columns. The percolation is carried out at a rate of 15 cm/min.

At the end of percolation, the head column (H), the level of exchange with regard to lithium of the beads of which is in the region of 94%, is washed and then discharged and replaced by a fresh charge of new beads. This bed of beads is then positioned at the tail of the exchange line. Consequently, the normal functioning (percolation of an LiCl solution with a concentration equal to 1.1 $E_0$) begins according to the following cycle:

1) Transfer of a fresh charge of 2 700 kg (anhydrous equivalent) of new beads into the free column of the carrousel, which is de facto positioned in the tail position of the carrousel, as indicated above.

2) Percolation solely over the tail column of a recycled LiCl solution originating from the preceding cycle; this solution, comprising of the order of 0.3 $E_0$ of Li but rich in Na+K, corresponds to the final liquid contents of the column (hold up) forced out of the carrousel during the preceding cycle. This stage makes it possible to fix, to the virgin beads, approximately 50% of the Li present in the recycled solution, on the one hand, and to preheat the fresh column, which makes it possible to promote the coming exchange with Li, on the other hand ("finishing" recycling (2)).

The effluent (2) resulting from the carrousel during this stage (essentially wetting water) is directed to the effluent treatment plant.

3) Percolation over the head column of 10 $m^3$ of a pure solution of LiCl with a concentration of 1.4M at 115° C. (equivalent to 1.1 $E_0$ of Li, i.e. "e"=0.1 $E_0$).

The percolation is carried out over the entire length of the exchange line at the rate of 15 cm/min; the effluent recovered (10 $m^3$), depleted in Li (of the order of 0.15 $E_0$) and rich in Na+K, is also directed to the effluent treatment plant (3).

The choice of the percolation rate is dictated by flow control conditions: as plug flow is essential to ensure methodical progression of the front in the percolation columns, a minimal pressure drop is essential in order to avoid excessively great preferential flows. Taking into account the size of the beads employed, the optimum percolation rate was estimated at 15 cm/min.

Although the Li concentration is favourable to the exchange, it was, however, chosen to dilute the LiCl solution so as to increase the volume of solution so as to favour the dynamic contact time.

4) Washing the head column, the most thoroughly exchanged of the carrousel.

This stage consists in "forcing out" the liquid contents of the head column over the entire length of the carrousel (that is to say a true stage of Li percolation) by percolation of 4.5 $m^3$ of tap water at 15 cm/min. The solution recovered at the outlet of the exchange line is recovered in a dedicated vessel and will be recycled to the following cycle by percolation over the fresh column of new beads (finishing recycling (2)).

The additional washing is carried out by percolating 0.5 $m^3$ of tap water exclusively over the head column, so as to ensure a minimum residual amount of chlorides on the lithium-exchanged beads.

5) Unloading the head column and transfer (4) of the charge to the drying section.

The cycle is then terminated and a fresh charge of new beads can again restore the integrity of the carrousel.

In brief, the manufacturing cycle is in accordance with the diagram in the appended FIGURE.

It is found that, with the passing of the cycles, the level of exchange with regard to lithium of the withdrawn head column decreases and shows a trend towards values (91–92%) lower than that targeted (96%):

94% after startup,
93.5% after the first cycle,
92% after the second cycle,
91.8% after the third cycle.

When running under stable conditions, the maximum level of exchange with respect to lithium obtained is less than 92% and the output with regard to fixed lithium is 87%.

b-2. The lithium exchange is carried out on the beads prepared in stage a in the same carrousel as that described in b-1 and which operates under the same operating conditions except as regards the normal functioning, where a percolation over the head column is carried out with a pure solution of LiCl with a concentration of 1.4M at 115° C. (equivalent to 1.3 $E_0$ of Li, i.e. "e"=0.3 $E_0$ instead of 0.1 $E_0$.

After startup, the beads in the head column of the carrousel exhibit a degree of exchange with regard to lithium equal to 98% but, on conclusion of the following cycles (still carried out with 1.3 $E_0$), their degree of exchange with regard to lithium decreases from cycle to cycle to show a trend towards values of between 92 and 93%, values also far below our objective of 96%:

98% after startup
98% after the first cycle (effect of the forced startup)
95% after the second cycle
94.2% after the third cycle
93.5% after the fourth cycle
92.5% after the fifth cycle.

When operating under stable conditions, the maximum level of exchange with regard to lithium obtained is in the region of 92.5% while the output is only 74%.

Example 2

Beads prepared in Example 1.a are placed in a carrousel as defined in Example 1.b-1, where the lithium exchange is carried out according to the process defined above:

1—initial startup of the carrousel, which operation consists in placing the system of the 3 columns at a level of Li exchange such that the process is running from the insertion of a fresh charge into the carrousel, 2—normal functioning (the process follows the same procedure as that described in Example 1 and leads to results which are stable overall cycle-after-cycle), 3—end of the cycle.

The initial startup (1—) consists in percolating a solution of lithium chloride (1) over the 3 columns of the carrousel which are filled with beads, the amount of Li percolated being of the order of 4 $E_0$ and the LiCl solution, with a concentration of 4M, being brought to 115° C. before feeding the line of the 3 columns. The percolation is carried out at a rate of 12 cm/min.

In comparison with the processes for lithium exchange of Example 1 b-1 and b-2, the operation is carried out with an LiCl solution (1) with a concentration of 4M, so as:

1—to benefit from an optimum driving force for lithium exchange,

2—to decrease the volumes of effluents to be treated, on the one hand, and the volume of the solution to be recovered in value, on the other hand, which is a significant advantage in the case where the solution to be recovered in value has to be transported (reduced transportation costs), the percolation rate was reduced to 12 cm/min, so as not to excessively reduce the dynamic contact times (optimum contact time/speed of flow, the concentration of the solution being fixed).

At the end of percolation, the head column, the level of exchange with regard to lithium of the beads of which is in the region of 96%, is washed and then discharged and replaced by a fresh charge of "virgin" beads. This bed of beads is then positioned at the tail of the exchange line. From that time on, normal functioning begins.

Normal functioning according to 2—) follows the following cycle:

1) Transfer of a fresh charge of 2 700 kg (anhydrous equivalent) of new beads into the free column of the carrousel, which is de facto positioned in the tail position of the carrousel.

2) Percolation solely over the tail column of a recycled LiCl solution resulting from the preceding cycle; this solution, comprising of the order of 0.3 $E_0$ of Li but rich in Na+K, corresponds to the final liquid contents of the column which are forced out of the carrousel during the preceding cycle.

This stage makes it possible, first, to fix, to the virgin sieve, approximately 50% of the lithium present in the recycled solution and, secondly, to preheat the fresh column, which makes it possible to promote the lithium exchange (finishing recycling (2)).

The effluent resulting from the carrousel during this stage (essentially wetting water) is directed to the effluent treatment plant.

3) Percolation over the head column of 6.6 m³ of a pure 4M solution of LiCl at 115° C. (equivalent to 2.2 $E_0$ of Li, i.e. "e"=1.2 $E_0$):

in a 1st step, 4.5 m³ (approximately the liquid contents of the head column) of an aqueous solution (5) rich in Li (of the order of 1.05 $E_0$) and poor in Na+K are extracted at the bottom of the head column. This solution (5), which can be easily recovered in value, exhibits the following mean characteristics:

concentration of Li between 19 and 20 g/l
Li/Na molar ratio of between 6 and 8
Li/K molar ratio of between 50 and 60 in a 2nd step, the percolation is carried out over the entire length of the exchange line at the same rate of 12 cm/min and the effluent (3) recovered (2.1 m³), poor in Li (of the order of $0.15_0$, corresponding to the result of the recycling percolation carried out over the virgin column at the beginning of the cycle) and rich in Na+K, is directed to the effluent treatment plant.

4) Washing the head column, exchanged, at this stage in the cycle, to a level of 96% with regard to Li.

This stage consists in displacing the liquid contents of the head column (or holdup) over the entire length of the carrousel (which corresponds to a true stage of Li percolation) by percolation of 4.5 m³ of tap water at 12 cm/min. The solution recovered at the outlet of the exchange line is stored in a dedicated vessel and will be recycled to the following cycle by percolation over the fresh column of "virgin" sieve (finishing recycling (2))

Additional washing is carried out by percolating 0.5 m³ of tap water exclusively over the head column, so as to ensure a minimum level of residual chlorides on the adsorbent.

5) Discharge of the charge of the head column (4) and transfer to the drying section.

The cycle is then terminated and a fresh charge of virgin beads can again restore the integrity of the carrousel.

BRIEF DESCRIPTION OF THE DRAWINGS

In brief, the manufacturing cycle follows the diagram in the appended FIGURE.

When operating under stable conditions, the maximum level of exchange with regard to lithium obtained is 96% and the output is 45% but the stream at the carrousel outlet can be easily recovered.

Example 3

Before being agglomerated according to the process described in detail in Example 1.a, the zeolite NaK LSX of Example 1.a is subjected to a simultaneous exchange of rare earth metal ions and of sodium ions, so as to eliminate the level of the cationic sites of the zeolite occupied by potassium ions to at most 10% (degree of exchange with respect to the sum Na+K), by suspending the zeolite NaK LSX in water with an aqueous solution of salts of rare earth metals and of Na. An agglomerated zeolite is obtained for which the Na level represents at least 90% of the level of Na+K in the starting zeolite and for which the degree of exchange with regard to trivalent rare earth metal cations is equal to approximately 14%.

The beads thus prepared are placed in a carrousel as defined in Example 1.b-1, where the lithium exchange of the zeolite of the said beads is carried out according to the process defined in Example 1.

The Li percolation is carried out according to the process described in Example 2 with the following modifications:

During the initial startup, the amount of percolated Li is of the order of 4 $E_0$. The LiCl solution, with a concentration of 5M, is brought to 115° C. before feeding the line of the 3 columns and the percolation is carried out at a rate of 12 cm/min.

By employing an LiCl solution with a concentration of 5M and beads for which the K content is less than that of the beads of Example 1.a, the precipitation limit of the LiCl/NaCl/KCl solution in the columns of the carrousel is lowered.

The increase in the LiCl concentration to 5M makes it possible, as for the process of Example 2:

1—to benefit from an optimum driving force for the Li exchange

2—to decrease, first, the volumes of effluents to be treated and, secondly, the volume of solution to be recovered in value.

The percolation rate is maintained at 12 cm/min, so as not to further reduce the dynamic contact times. It will advantageously be reduced in the case of a charge of beads with a smaller diameter.

At the end of percolation, the head column, exchanged to more than 96% with regard to Li, is washed and then discharged and replaced by a fresh charge of "virgin" sieve. This bed of beads is then positioned in the tail of the exchange line. From that time on normal functioning begins according to the following cycle:

1) Transfer of a fresh charge of 2 700 kg (anhydrous equivalent) of new beads of Na, εK, M, LSX into the free column of the carrousel, which is de facto positioned in the tail position of the carrousel.

2) Percolation solely over the tail column of a recycled LiCl solution resulting from the preceding cycle; this solution, comprising of the order of $0.3_0$ of Li but rich in Na, corresponds to the final liquid contents of the column forced out of the carrousel during the preceding cycle.

This stage makes it possible, first, to fix, to the virgin beads, approximately 50% of the Li present in the recycled solution and, secondly, to preheat the fresh column, which makes it possible to promote the Li exchange (finishing recycling (2)).

The effluent resulting from the carrousel during this stage (essentially wetting water) is directed to the effluent treatment plant (3).

3) Percolation over the head column of 5.3 m³ of a pure solution of LiCl with a concentration of 5M at 115° C. (equivalent to 2.2 $E_0$ of Li, i.e. "e"=1.2 $E_0$):

in a 1st step, 3.6 m³ (approximately the liquid contents of the head column) of a solution rich in Li (of the order of 1.05 $E_0$) and poor in Na+εK are extracted at the bottom of the head column. This solution, which can be recovered in value, exhibits the following mean characteristics:

Li concentration between 23 et 25 g/l
Li/Na molar ratio in region of 4.5
Li/K molar ratio in the region of 160 in a 2nd step, the percolation is carried out over the entire length of the exchange line at the same rate of 12 cm/min and the effluent recovered (1.7 m³), poor in Li (of the order of $0.15_0$; this is the result of the recycling percolation carried out over the virgin column at the beginning of the cycle) and rich in Na+K, is directed to the effluent treatment plant (3).

4) Washing the head column, exchanged, at this stage in the cycle, to a level of 96% with regard to Li.

This stage consists in displacing the liquid contents of the head column over the entire length of the carrousel (which corresponds in fact to a true stage of Li percolation) by percolation of 4.5 m³ of tap water at 12 cm/min. The solution recovered at the outlet of the exchange line is recovered in a dedicated vessel and will be recycled to the following cycle by percolation over the fresh column of "virgin" beads (finishing recycling (2)).

Additional washing is carried out by percolating 0.5 m³ of tap water exclusively over the head column, so as to ensure a minimum residual amount of chlorides on the sieve.

5) Discharge of the head column and transfer of the charge to the drying section.

The cycle is then terminated and a fresh charge of virgin beads can again restore the integrity of the carrousel.

Here again, at the end of the cycle, 2 alternatives can be applied:

either the washing is continued over the line of the 3 columns (with the recovery of the Li solution for the purposes of recycling over "virgin" beads at the beginning of the following campaign), which involves the drying of 2 charges of pre-exchanged beads which will be used to initiate the startup of the following campaign, or the exchange is continued over the line of the 3 columns with the recovery of the solutions rich in Li which are generated, in order to achieve a degree of exchange with regard to Li of 96% for the zeolites of the beads packing the final columns of the carrousel. These solutions will be used as startup solution for the following campaign.

In brief, the manufacturing cycle follows the diagram in the appended FIGURE.

This process provides:

a level of Li exchange of greater than 96%, on average slightly greater than the level of Li exchange obtained in Example 2, an improvement due to the increase in Li exchangeability on an Na–εK LSX base in comparison with an Na–K LSX base, secondly, an increased recovery in value of the Li solution collected at the bottom of the head column because of the low K content, which makes it possible to envisage an integrated process in which this solution will be entirely recycled after removing the Na in a subsidiary selective crystallization unit.

Example 4

Beads agglomerated according to the procedure described in Example 1.a are subjected to lithium exchange according to the process of Example 3, to which the following modifications are made:

Treatment of the phase extracted from the head column (bleed) at the n–1 cycle (3.6 m³) with:
Li concentration ~23/25 g/l
Li/Na molar ratio in the region of 4.5
Li/K molar ratio in the region of 160 according to the following stages:
1. Concentration under vacuum at a temperature in the region of 70° C., compatible with the production of a concentrate with an LiCl content of approximately 400 g/l.
2. Cooled to approximately 25° C., with an appropriate heat exchange device, of the stream rich in NaCl crystals resulting from stage 1.
3. Filtration according to the usual methods of the stream rich in LiCl resulting from stage 2, so as to minimize the losses of lithium chloride solution.
4. Dilution with water to bring the lithium content to the concentration corresponding to 5M (with regard to LiCl).

Approximately 2 400 l of an LiCl solution with a concentration of 5M and comprising less than 2 g/l of NaCl at less than 3 g/l of KCl are thus obtained.

Percolation at the n cycle
of the 2.4 m³ of 5M LiCl solution resulting from the treatment described above,
then of an additional 2.9 m³ of pure 5M LiCl solution.

The manufacturing cycle then follows the scheme described in Example 2 with an Li output, as defined in Examples 1 to 3, of greater than 85%, taking into account the losses inherent in the process for concentrating/purifying the lithium bleed described above.

Example 5

Before being agglomerated according to the process described in Example 1.a, the zeolite NaK LSK of Example 1.a is subjected to an exchange of sodium ions, so as to limit the level of the cationic sites of the zeolite occupied by potassium ions to 8% (degree of exchange with respect to the sum Na+K), by suspending the zeolite NaK LSK in water with an aqueous solution of Na salts. An agglomerated zeolite is obtained for which the degree of Na represents 92% of the degree of Na+K in the starting zeolite.

The lithium exchange which follows is carried out, on the one hand, on the beads thus prepared and, secondly, with beads of zeolite NaK LSK not having been subjected to an exchange of sodium ions.

The beads are placed in a carrousel as defined in Example 1.b-1, where the zeolite of the said beads is subjected to lithium exchange according to the process defined in Example 3.

At the end of startup percolation (with an equivalent of 4 $E_0$ of Li), the head column, exchanged to more than 96% with regard to Li, is washed, then discharged and replaced by a fresh charge of "virgin" sieve. This bed of beads is then positioned in the tail of the exchange line. From that time on, normal functioning begins according to the following cycle:

1) Transfer of a fresh charge of 2 700 kg (anhydrous equivalent) of new beads of Na, εK, LSX into the free column of the carrousel, which is de facto positioned in the tail position of the carrousel.

2) Percolation solely over the tail column of a recycled LiCl solution resulting from the preceding cycle; this solution, comprising of the order of 0.3 $E_0$ of Li but rich in Na, corresponds to the final column holdup forced out of the carrousel during the preceding cycle.

This stage makes it possible not only to fix, to the virgin beads, approximately 50% of the Li present in the recycled solution but also to significantly lower the residual potassium content in the starting zeolite. Furthermore, it makes it possible to preheat the fresh column, which promotes the Li exchange (finishing recycling (2)).

The effluent resulting from the carrousel during this stage (essentially wetting water but also a stream rich in sodium and potassium) is directed to the effluent treatment plant (3).

3) Percolation over the head column of 6.6 m³ of a pure solution of LiCl with a concentration of 5M at 115° C. (equivalent to 2.2 $E_0$ of Li, i.e. "e"=1.2 $E_0$):

in a 1st step, 4.2 m³ (approximately the holdup of the column) of a solution rich in Li (of the order of 1.05 $E_0$) and poor in Na+εK are extracted at the bottom of the head column. This solution, which can be recovered in value, exhibits the following mean characteristics:
Li concentration between 23 et 25 g/l
Li/Na molar ratio in region of 5.5
Li/K molar ratio of at least 200 in a 2nd step, the percolation is carried out over the entire length of the exchange line at the same rate of 12 cm/min and the effluent recovered (2.4 m³), poor in Li (of the order of $0.15_0$; this is the result of the recycling percolation carried out over the virgin column at the beginning of the cycle) and rich in Na, is directed to the effluent treatment plant (3).

4) Washing the head column, exchanged, at this stage in the cycle, to a level of 96% with regard to Li.

This stage consists in displacing the holdup of the head column over the entire length of the carrousel (which corresponds in fact to a true stage of Li percolation) by percolation of 4.5 m³ of tap water at 12 cm/min. The solution obtained at the outlet of the exchange line is recovered in a dedicated vessel and will be recycled to the following cycle by percolation over the fresh column of "virgin" beads (finishing recycling (2)).

Additional washing is carried out by percolating 0.5 m³ of tap water exclusively over the head column, so as to ensure a minimum residual amount of chlorides on the sieve.

5) Discharge of the head column and transfer of the charge to the drying section.

The cycle is then terminated and a fresh charge of virgin beads can again restore the integrity of the carrousel.

After 8 cycles, the virgin column is substituted with beads of zeolite Na K LSK which have not been subjected to the sodium pre-exchange.

The unexpected result is that the change from the Na ϵK LSX beads (NaK LSX beads pre-exchanged with sodium) to NaK LSK beads (beads which have not been pre-exchanged with sodium) did not modify the quality of the 4.2 m³ stream extracted from the head column and in particular the potassium content, which remains less than 0.5 g/l despite the significantly raised potassium content of the starting zeolite.

Systematic sodium pre-exchange (in the case where it is not carried out as coexchange with di- and/or trivalent ions) is therefore unnecessary for the production of K contents of less than 1 g/l in the stream. It is sufficient to initiate the percolation cycles with beads pre-exchanged with sodium. The finishing recycling stage is then carried out with a stream comprising Li/Na and Na/K ratios favourable for selective extraction of the potassium present in the zeolite of the tail column. The final result (K content in the bleed) is thus comparable with that obtained with a zeolite pre-exchanged with sodium.

When the phase extracted from the head column (bleed) in the n–1 cycle (4.2 m³) with:

Li concentration ~24 g/l
Li/Na molar ratio in the region of 5.5
Li/K molar ratio greater than 200 is treated according to the selective crystallization stages described in Example 4, approximately 2 600 l of the LiCl solution with a concentration of 5M and comprising less than 2 g/l of NaCl and less than 2 g/l of KCl are obtained.

This treated stream of 2.6 m³ of 5M LiCl solution is percolated in the n cycle before being supplemented by the percolation of 4 m³ of pure 5M LiCl solution.

The manufacturing cycle then follows the scheme described in Example 2 with an Li output of greater than 85%, taking into account the losses inherent to the process for concentrating/purifying the lithium bleed described above.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. Process for the preparation of zeolites of X type having an Si/Al atomic ratio of less than or equal to 1.5, the exchangeable cations of which comprise, referred to as equivalents:

from approximately 50 to approximately 99% of lithium ions, from approximately 4 to approximately 50% of trivalent ions selected from aluminum, scandium, gallium, iron (III), chromium (III), indium, yttrium, lanthanides or rare earth metals, alone or as mixtures, and/or of divalent ions selected from calcium, strontium, zinc, copper, chromium (II), iron (II), manganese, nickel or cobalt, alone or as a mixture, 0 to approximately 15% of residual ions selected from sodium, potassium, ammonium or hydronium, alone or as a mixture, agglomerated with a binder, according to which a portion of the exchangeable cations of an agglomerated zeolite of X type, the exchangeable cations of which are sodium, potassium, ammonium and/or hydronium cations and/or di- and/or trivalent cations, is exchanged with lithium, wherein the process comprises:

(a) providing a starting zeolite, the starting zeolite being an agglomerated zeolite of X type comprising exchangeable cations selected from the group consisting of sodium, potassium, ammonium, hydronium, divalent and trivalent cations;

(b) providing a plurality of receptacles arranged in series in an interchangeable manner to form a carrousel;

(c) filling each of the receptacles with portions of the starting zeolite;

(d) introducing a first solution of at least one lithium compound through an inlet formed in a first receptacle in the carousel and percolating said first solution successively through each of the receptacles in the carrousel, the solution coming into contact with the starting zeolite portions disposed in the receptacles such that exchange of the lithium and the exchangeable cations occurs;

(e) through an outlet formed in the first receptacle, drawing a lithium-containing bleed off from a stream formed in the first receptacle by the contact between the solution of the at least one lithium compound and the starting zeolite, said lithium-containing bleed containing excess lithium;

(f) through an outlet formed in a final receptacle in the series of receptacles, drawing off a final effluent stream formed by the solution of the at least one lithium compound percolating through said carrousel in contact with said starting zeolite, said final effluent stream comprising compounds comprising the exchangeable cations from the starting zeolite and traces of the at least one lithium compound; and (g) modifying the sequence of receptacles in the carrousel in cycles, each cycle comprising the percolation of the solution of the at least one lithium compound from the first receptacle to the final receptacle in the carrousel and resulting in a desired degree of lithium exchange for the starting zeolite in the first receptacle, wherein said modifying of the sequence of receptacles after each cycle involves:

(i) removing said first receptacle from the carousel;

(ii) washing the lithium-containing zeolite in the first receptacle to free the zeolite of the solution of the at least one lithium compound;

(iii) optionally replacing the lithium-containing zeolite in the first receptacle with a second starting zeolite;

(iv) introducing a second solution of at least one second lithium compound into an inlet of a second receptacle disposed successively to the first receptacle in the carrousel and percolating said second solution through the carrousel, the percolation through the second receptacle forming a second lithium-containing zeolite;

(v) washing the second lithium-containing zeolite in the second receptacle to free the zeolite of the second solution of the at least one second lithium compound;

(vi) optionally replacing the second lithium-containing zeolite in the second receptacle with a third starting zeolite; and (vii) optionally, repeating steps (i)–(iii) for each of the receptacles in the carrousel.

2. Process according to claim 1, wherein the temperature of the solution of the at least one lithium compound is between 80 and 120° C.

3. Process according to claim 1, wherein the concentration of the solution of the at least one lithium compound is between 1 and 10M.

4. Process according to claim 3, wherein the concentration of the solution of the at least one lithium compound is between 3 and 6M.

5. Process according to claim 1, wherein the degree of exchange of the zeolite for potassium before the lithium exchange, is less than or equal to 15% of the total of the exchangeable sites.

6. Process according to claim 5, wherein the degree of exchange of the zeolite for potassium is less than or equal to 10%.

7. Process according to claim 1, wherein it comprises, before the lithium exchange, converting a majority of the exchangeable cations of the starting zeolite to a single monovalent cationic species, said conversion being carried out before and/or after agglomeration of the zeolite.

8. Process according to claim 7, wherein conversion is all of the exchangeable cations and the single monovalent cationic species is a sodium or ammonium ion.

9. Process according to claim 1, wherein it comprises purifying the lithium-containing bleed by crystallization of said bleed.

10. Process according to claim 1, wherein the final effluent is recycled over the final receptacle of the carrousel.

11. Process according to claim 1, wherein the starting zeolite is distributed in 3 receptacles.

12. Process according to claim 11, further comprising:

either in installing, as a first and second receptacle in the series of receptacles, 2 pre-exchanged receptacles resulting from the end of the preceding cycle, a final receptacle in the series of receptacle comprising unexchanged starting zeolite beads;

or in starting with 3 receptacles filled with unexchanged starting zeolite but partially replacing a pure solution of at least one lithium compound with a recycled solution of Li resulting from the end of the preceding campaign cycle.

13. Process according to claim 12, wherein at the end of a cycle, washing the zeolite in the receptacles, recovering the lithium-containing solution for the purposes of recycling over unexchanged starting zeolite beads at the beginning of the following cycle, and drying 2 charges of pre-exehanged zeolite beads, which are used in a following cycle, or continuing cation exchange in the receptacles with recovery of lithium-containing bleeds which are generated, to achieve a degree of exchange with regard to Li of 96% for zeolite in the final receptacles of the carrousel.

14. Process according to claim 11, wherein the Si/Al atomic ratio is between 0.9 and 1.1, the amount of lithium ions is at least 96%, said starting zeolite being distributed in at least 3 receptacles, and the targeted level of exchange being greater than 96%.

15. Process according to claim 1, wherein the temperature of the solution of the at least one lithium compound is between 110 and 120° C.

16. Process according to claim 1, wherein the temperature of the solution of the at least one lithium compound is greater than 120° C.

* * * * *